United States Patent [19]

Hansen et al.

[11] Patent Number: 5,993,900
[45] Date of Patent: Nov. 30, 1999

[54] ACID-GRAFTED HYDROGENATED ELASTOMER/ENDBLOCK AROMATIC RESIN PRIMER

[75] Inventors: David Romme Hansen, Houston; Lydia Ann Salazar, Katy, both of Tex.

[73] Assignee: Shell Oil Company, Houston, Tex.

[21] Appl. No.: 08/903,252

[22] Filed: Jul. 25, 1997

Related U.S. Application Data

[63] Continuation of application No. 08/669,014, Jun. 24, 1996, abandoned.

[51] Int. Cl.$^6$ .............. B05D 5/10; C08L 51/00; C08K 5/01
[52] U.S. Cl. .......... 427/208.2; 525/68; 525/70; 524/504
[58] Field of Search .......... 525/68; 427/208.2; 524/504

[56] References Cited

U.S. PATENT DOCUMENTS

| | | | |
|---|---|---|---|
| H1564 | 7/1996 | St. Clair | 525/98 |
| Re. 27,145 | 6/1971 | Jones | 260/880 |
| 4,332,858 | 6/1982 | Saitoh et al. | 428/412 |
| 4,360,568 | 11/1982 | Allison | 428/411 |
| 4,578,429 | 3/1986 | Gergen et al. | 525/291 |
| 4,692,357 | 9/1987 | Mayumi et al. | 427/393.5 |
| 4,719,261 | 1/1988 | Bunnelle et al. | 525/97 |
| 4,835,200 | 5/1989 | St. Clair | 524/100 |
| 5,019,615 | 5/1991 | Mizuno et al. | 524/260 |
| 5,086,105 | 2/1992 | Abe et al. | 524/494 |
| 5,093,422 | 3/1992 | Himes | 525/98 |
| 5,175,211 | 12/1992 | Sanada et al. | 525/66 |
| 5,194,530 | 3/1993 | Stevens et al. | 526/82 |
| 5,229,464 | 7/1993 | Erickson et al. | 525/314 |
| 5,331,038 | 7/1994 | Dillman | 524/505 |
| 5,342,885 | 8/1994 | St. Clair | 525/65 |
| 5,374,680 | 12/1994 | Chundury et al. | 525/80 |
| 5,541,243 | 7/1996 | Ohmura et al. | 524/609 |
| 5,597,865 | 1/1997 | Jackson | 525/80 |
| 5,599,621 | 2/1997 | Akhter | 428/480 |

Primary Examiner—Robert E. Sellers

[57] ABSTRACT

A primer composition suitable for metallic substrates, which primer comprises a hydrogenated elastomeric block copolymer having resinous endblocks, the copolymer being functionalized by treatment with an unsaturated monomer such as maleic anhydride. The primer composition further comprises an endblock compatible resin such as an aromatic resin. Such compositions are especially useful for priming metal which is later to be fabricated into channels and frames. Thus, it is of particular utility in the construction of double glazed insulated windows.

6 Claims, 1 Drawing Sheet

ACID-GRAFTED HYDROGENATED ELASTOMER/ENDBLOCK AROMATIC RESIN PRIMER

This is a continuation of application Ser. No. 08/669,014, filed Jun. 24, 1996 now abandoned.

BACKGROUND OF THE INVENTION

This invention relates to primers to enhance bonding of materials to metal substrates.

A number of special problems are encountered when attempting to bond materials to a metal substrate. A primary problem is that many desirable hot melt applied coatings, sealants, and adhesives do not adhere well to metal because the hot melt sets up before it can fully adhere or "wet out" the surface of the metal. The application of adhesives and sealants to metals from a hot melt is thus hampered by the tendency of metals to be good conductors of heat. In certain specialized areas, such as double glazed windows where a metal frame with a preapplied elastomeric sealant is sandwiched between two panes of glass and heated, the operation is further complicated by the necessity to keep the temperature relatively low to prevent volatiles from being released which would fog the glass. The difficulty cannot be overcome simply by using a less viscous sealant. A certain minimum thickness of sealant is required to maintain proper dimensions and seal flexibility; a low viscosity sealant would be squeezed out. Finally, the final seal must exhibit sufficient resistance to shearing forces to maintain the integrity of the finished window unit.

SUMMARY OF THE INVENTION

It is an object of this invention to provide a primer composition for metal substrates;

It is a further object of this invention to provide a primed metal surface with improved adherence to sealants;

It is yet a further object of this invention to provide a metal to glass seal; and It is yet a further object of this invention to provide a composition which assists in forming good metal seals and glass seals in a double glazed insulated window construction.

In accordance with this invention a metal primer composition is provided comprising a functionalized hydrogenated elastomeric block copolymer and an endblock compatible resin.

Also provided is a method of bonding a material to a metal strip using a primer comprising functionalized hydrogenated elastomeric block copolymer and an endblock compatible resin.

BRIEF DESCRIPTION OF THE DRAWINGS

In the drawings, forming a part hereof, wherein like referenced characters denote like parts in the various views.

DETAILED DESCRIPTION OF THE INVENTION

Figure 1:
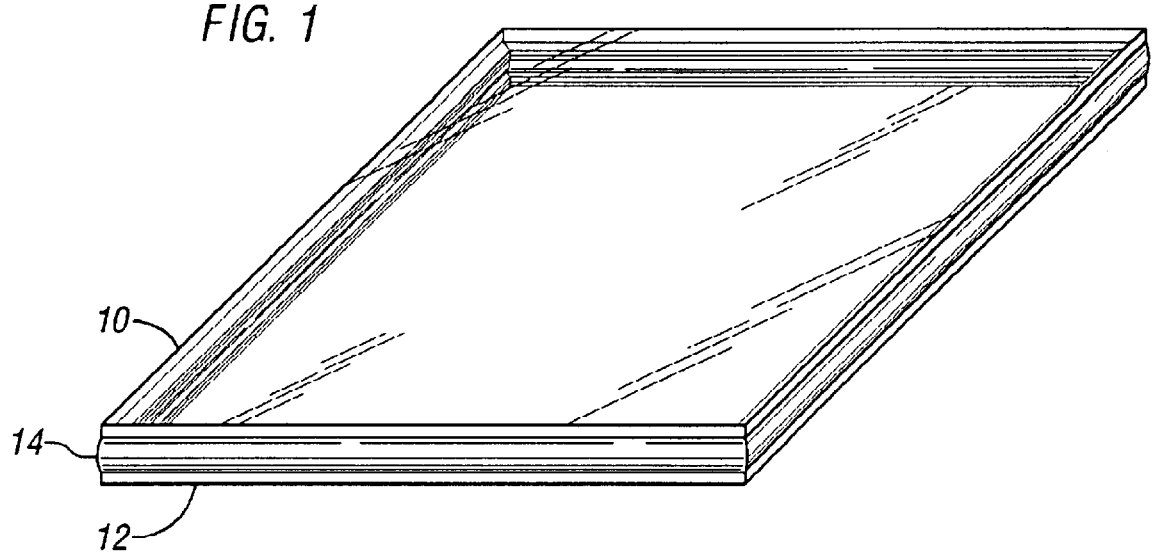
FIG. 1 is a perspective view of a double glazed window of the type which could be made utilizing this invention.

Applicants have found that the combination of an endblock compatible resin and an elastomeric block copolymer which has been hydrogenated and treated with a monomer containing a functional group such as maleic anhydride gives a primer composition with improved adhesion characteristics.

The elastomeric block copolymers suitable for use herein are known in the art, as disclosed for instance in Stevens et al. U.S. Pat. No. 5,194,530 (Mar. 16, 1993), the disclosure of which is hereby incorporated by reference. Suitable polymers for use in this invention have endblocks made of polymerized monovinyl aromatic compound, thus giving a resinous segment, and a midblock made up at least predominantly of polymerized conjugated diene monomer, thus giving an elastomeric segment. The polymers can be linear, ABA, or radial.

Suitable monovinyl aromatic compounds are those having 8 to 20 carbon atoms as exemplified by styrene and styrene homologs such as alpha-methylstyrene and para-methylstyrene. Styrene is especially preferred. Suitable conjugated dienes include those having 4 to 8 carbon atoms. Illustrative of such conjugated dienes are 1,3-butadiene (butadiene), 2-methyl-1,3-butadiene (isoprene), 1-3-pentadiene (piperylene), 1,3-octadiene, and 2-methyl-1,3-pentadiene. Preferred conjugated dienes are butadiene and isoprene.

The endblock segments preferably have a molecular weight of at least 4500, preferably 5000 to 18,000, more preferably 5000 to 10,000. The monovinyl substituted aromatic compound component must be present in an amount of at least about 13 weight percent based on the total weight of the polymer. Generally about 13 to about 40 weight percent resinous component, preferably 25 to 35 weight percent aromatic component, is utilized. The weight percentages are based on the weight of the total polymer. The molecular weight can vary considerably but generally will be within the range of about 30,000 to about 100,000, preferably 40,000 to 60,000.

By molecular weight as it refers to linear or ABA polymers is meant the molecular weight as measured by gel permeation chromatography (GPC), where the GPC system has been appropriately calibrated with polystyrene standards. For anionically polymerized linear polymers, the polymer is essentially monodispersed and it is both convenient and adequately descriptive to report the "peak" molecular weight of the narrow molecular weight distribution observed. Such methods are well known and described in patents including U.S. Pat. No. 5,229,464, the disclosure of which is hereby incorporated by reference. Since styrene is used as the calibration standard, the measurement directly gives the absolute molecular weight of the styrene endblocks. From this and the known percent styrene, the absolute molecular weight of the midblock is calculated. The molecular weight is measured on an aliquot which is removed after the first step of the polymerization and terminated to deactivate the initiator.

Measurement of the true molecular weight of a final coupled star or radial polymer is not as straightforward or as easy to make using GPC. This is because the star-shaped molecules do not separate and elute through the packed GPC columns in the same manner as do linear polymers used for the calibration, and, hence, the time of arrival at a UV or refractive index detector is not a good indicator of the molecular weight. A good analytical method to use for a star polymer is to measure the weight average molecular weight by light scattering techniques. The sample is dissolved in a suitable solvent at a concentration of less than 1 gram of sample per 100 milliliters of solvent and then filtered directly into the light scattering cell using a syringe and porous membrane filters of less than 0.5 microns pore size. The light scattering measurements are performed as a function of scattering angle and of polymer concentration using standard procedures. The differentials refractive index (DRI) of the sample is measured at the same wave length and in the same solvent used for the light scattering. This results in a molecular weight value which approximates weight average molecular weight.

The elastomeric block polymers utilized in this invention are hydrogenated to such a degree that the unsaturation of the elastoineric block is greatly reduced without significant hydrogenation of the aromatic unsaturation in the resinous block component. Generally, at least 90 percent of the unsaturation in the diene center block is hydrogenated and no more than 25 percent, preferably less than 10 percent, of the aromatic unsaturation is hydrogenated. Such hydrogenation techniques are known in the art and disclosed, for instance, in Jones Reissue Pat. No. 27,145 (Jun. 22, 1971), the disclosure of which is hereby incorporated by reference. Thus, for instance with one of the preferred block copolymers, styrene-butadiene-styrene, the resulting hydrogenated polymer can be viewed as a styrene-ethylene/butylene-styrene block copolymer. Similarly, another preferred block copolymer, styrene-isoprene-styrene linear block copolymer, can be viewed as a styrene-ethylene/propylene-styrene block copolymer.

The thus hydrogenated elastomers are functionalized by treatment with an unsaturated monomer having one or more functional groups or their derivatives, such as carboxylic acid groups and their salts, anhydrides, esters, imide groups, amide groups, and acid chlorides in addition to at least one point of unsaturation.

The preferred monomers to be grafted onto the block copolymers to give the functionalized polymers utilized in this invention are maleic anhydride, maleic acid, fumaric acid, and their derivatives. It is well known in the art that these monomers do not polymerize easily. A further description of functionalizing selectively hydrogenated block copolymers can be found in Gergen et al. U.S. Pat. No. 4,578,429 (Mar. 25, 1986), the disclosure of which is hereby incorporated by reference.

The resulting grafted polymer will usually contain from about 0.02 to about 10, preferably 0.1 to 5, and most preferably 0.2 to 2.5 weight percent of grafted portion based on the weight of the total polymer including the grafted portion.

The composition of this invention contains in addition a resin which is compatible with the resinous endblock portion of the elastomeric block copolymer; i.e., an aromatic resin. The concept of resins which are compatible with the resinous endblock portion of an elastomeric block copolymer as contrasted with other resins which are compatible with the elastomeric midblock portion is well known in the art.

Mixtures of aromatic resins having high and low softening points may be used. Useful resins include coumarone-indene resins, poly alpha-methyl-styrene, polystyrene resins, vinyl toluene-(α-methyl styrene copolymers, polyindene resins, and polyphenylene oxides.

Examples of aromatic resins useful in the formulations of the present invention are AMOCO® 18 series resins, which are composed of alpha methyl styrene (Amoco); KRISTALEX® series resins, which are composed of alpha methyl styrene (Hercules); PICCOTEX® series resins, which are composed of alpha methyl styrene and vinyl toluene (Hercules); NEVCHEM® (Neville) and PICCO 6000 (Hercules) series resins, which are composed of aromatic hydrocarbons; CUMAR® series resins and CUMAR LX-509 (Neville), which are composed of coumarone-indene; ENDEX® 155 (Hercules), a resin derived by copolymerization of pure aromatic monomers; and PPO-612 (General Electric), which is a polyphenylene oxide.

To some extent it is desirable to coordinate the selection of the endblock compatible resin with the size of the endblock of the elastomeric copolymer. For instance, when operating at the lower end of the endblock molecular weight range of, say, 5000 to 7500 for the copolymers, an endblock compatible resin of lower molecular weight is preferred. Preferably for such 5000–7500 molecular weight endblock copolymers, endblock compatible resins with a Tg within the range of about 40° C. to about 70° C. are preferred. Also, 40° C. to 70° C. Tg endblock resins are particularly suitable to copolymers with 5000–10,000 molecular weight endblocks. Thus, for instance, a material such as KRISTALEX® 3100, which has a relatively low melting point, is suitable for the block copolymers having, say, 5000 to 7500 molecular weight endblocks as well as being suitable for copolymers having endblocks of intermediate molecular weight. Similarly, a high Tg endblock resin such as ENDEX® 155 is most suitable for those elastomeric block copolymers having relatively high molecular weight endblocks; i.e. those with molecular weights of 7000 or just above 7000 to 18,000. However, endblock compatible resin with Tg of from about 40° C. to about 170° C. can be used with the 7000–18,000 endblock polymers. Polyphenylene oxides with a Tg of around 160° C. are unusual in that they are compatible with copolymers that have styrene endblocks that range from 5000–15,000.

The endblock compatible resin is generally used in an amount within the range of about 10 to about 80 parts by weight, preferably 29 to 65 parts by weight, more preferably 40 to 58 parts by weight per 100 parts by weight of the elastoineric block copolymer.

Thus, the primer composition of this invention comprises the functionalized hydrogenated elastomeric block copolymer and the endblock compatible resin. While the compositions can contain other components such as oils, pigments, and tackifiers found in adhesive compositions, they generally consist essentially of the elastomeric block copolymer and the endblock resin. Generally, no crosslinking agents are used. This, of course, does not exclude the presence of materials such as stabilizers which are used for the normal purpose of stabilization.

Suitable stabilizers are disclosed in St. Clair, U.S. Pat. No. 4,835,200 (May 30, 1989), the disclosure of which is hereby incorporated by reference. Particularly preferred are hindered phenols, particularly less volatile hindered phenols such as tetrakis [methylene (3,5-di-tert-butyl-4-hydrooxyhydrocinnamate)] methane sold by Ciba Geigy under the tradename Irganox 1010.

The primers may be utilized for applying a primer coat to metal. They are suitable for use with any metal or conventional metal alloy such as steel, aluminum, copper, brass, and conventional metal plated metal such as tin plated steel.

The primers are preferably applied from solution. Suitable solvents include aromatic solvents such as toluene. Since the solvent will be evaporated away the concentration is not critical but generally solutions about 5 to about 50, preferably 10 to 40, weight percent solids are utilized. The solutions can be applied utilizing standard equipment for applying thin coatings of liquids on substrates, such as a roll coater or knife blade coater. Coatings having a thickness of about 0.05 to about 10 mils, preferably 0.1 to 1 mils, are utilized. Alternatively, the primer can be applied from a melt. The metal surface can be used as is or they may be precleaned with a solvent such as toluene, or they may be cleaned in any other manner conventional in the art.

The invention is of particular utility when used in conjunction with a hot melt sealant comprising an elastomeric block copolymer. Such sealants generally contain an elastomeric block copolymer, either hydrogenated or unhydrogenated, tackifying resins which can include endblock compatible resins plus midblock compatible resins, and antioxidants. Such compositions are shown in Allison U.S. Pat. No. 4,360,568 (Nov. 23, 1982), the disclosure which is hereby incorporated by reference.

The hot melt sealant can be applied at any temperature from just above room temperature to several hundred degrees and generally will be applied at temperatures in the range of about 200° F. (93° C.) to about 400° F. (204° C.), more preferably from about 200° F. (93° C.) to about 300° F. (149° C.) because of greater ease of handling at such temperatures.

The invention is particularly useful for producing double glazed insulated windows where one side of a flat metal strip is primed with the composition of the invention. The metal strip is bent into a "U" shape channel such that the primed surface faces outward and a bead of hot melt sealant is applied to the outside of the metal channel (i.e., to the primed surface). A glass panes is affixed to the sealant on the outside of each side-leg of the U-shaped channel as to produce an insulated structure having two panes of glass held apart by the metal picture frame around the periphery. The flat strip can be cut to allow forming into a rectangular "picture frame" spacer either before or after being primed.

Figure 2:
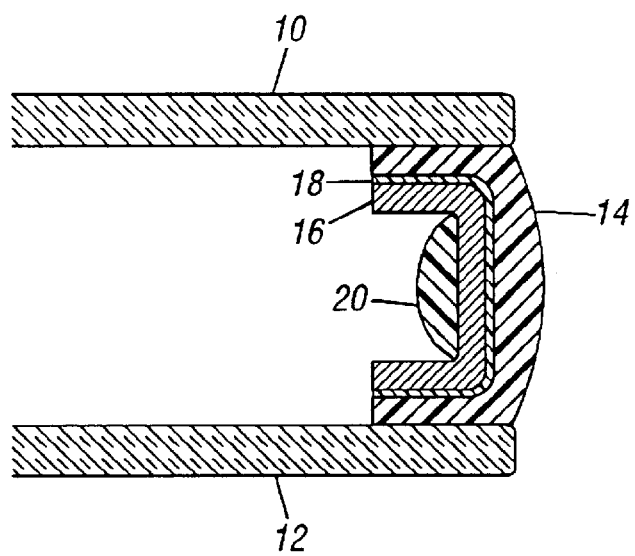
FIG. 2 is a cross section of an edge of the window of FIG. 1 showing the primer coat, sealant and U-shaped picture frame spacer.

With reference to FIG. I there is shown the two panes of glass, 10 and 12, held apart by picture frame 14, which is the U-shaped channel plus sealant. FIG. 2 is a cross section showing the U-shaped channel, or spacer, 16 having primer 18 applied to the outermost surface. Sealant 14 is applied to the outwardly facing primed surface of the U-shaped spacer and a bed of desiccant 20 carried in a sealant is applied to an inner surface of the spacer. The U-shaped spacer 16 and sealant 14 are sandwiched between the panes of glass 10 and 12 as shown. The sealant 14 could be manually applied as two individual beads on the outwardly facing spaced apart surface of the U-shaped spacer 16 with the sealant along the outside apex of the U-shape applied after assembly, or an extrusion cooling operation could be used to apply the sealant.

EXAMPLES

Five test runs were carried out as described herein below. Runs 1 and 1a used the primer I composition as set out in Table 1. Runs 2 and 2a used the primer 2 composition as set out in Table 1. Run 3 utilized no primer. The purpose of the test was to compare invention primer compositions of Runs 1, 1a, 2 and 2a with a system utilizing no primer (run 3).

TABLE 1

| Material | Primer 1 | Primer 2 |
|---|---|---|
| FG1901 polymer[1] | 100 | 100 |
| KRISTALEX ® 1120 resin[2] | 29 | 58 |
| Toluene | 80% | 80% |

[1]Selectively hydrogenated styrene-butadiene-styrene block copolymer having a styrene content of 30 weight percent and endblocks of 7300 molecular weight, which hydrogenated copolymer is grafted with maleic anhydride to give 1.7 weight percent bound graft.
[2]Aromatic resin with a softening point of 120° C. and a Tg of 56° C.

Primer formulations were applied to one side of a piece of tin plated steel to simulate an insulated window metal spacer. The metal was precleaned with toluene as needed and an bird applicator was utilized to cast a coating on the metal.

Runs 1 and 2

Both primer solutions 1 and 2 were clear when wet and when dried after being applied as thin films. After application the primed metal was hood dried for two hours, vacuum dried for one hour, and convection oven dried at 120° C. for 10 minutes. Dried film thickness was about 2.0–2.2 mils.

Flexibility: The primed metal samples of Run 1 and Run 2 were bent at both 90 degrees and 180 degrees to measure flexibility. Neither of the primers of Run 1 or Run 2 separated from the metal or cracked in bending.

Runs 1a and 2a

The metal specimens were coated to target 0.5 mil thick films. The average primer coating thickness was 0.8 mils. The resulting primed metal were dried in a hood overnight and placed in a convection air oven for 10 minutes at 200° C.

Flexibility: again, neither of the primers of Run 1a or Run 2a separated from the metal or cracked on bending at 90 and 180 degrees.

The following sealant batches were blended in a hot melt mixer:

| Ingredient | A | B |
|---|---|---|
| KRATON G 1726[1] | 0 | 25 |
| KRATON G 1727[2] | 100 | 75 |
| REGALREZ 1018 resin[3] | 275 | 275 |
| ENDEX ® 155[4] | 50 | 50 |
| SILQUEST ® A-186 silane[5] | 4 | 4 |
| IRGANOX ® 1010[6] | 1 | 1 |
| TOTAL, gms | 350 | 350 |
| H.M. Visc, cps @ 177° C. | 409,400 | 48,750 |

[1]Coupled hydrogenated styrene-butadiene-styrene triblock linear copolymer, 7300 molecular weight endblocks, 30 weight percent polymerized styrene, and a 20 percent coupling efficiency.
[2]Pilot plant remake of a hydrogenated styrene-butadiene-styrene triblock copolymer, 15,000 molecular weight endblocks, 15 weight percent polymerized styrene, and a 30 percent coupling efficiency.
[3]A hydrogenated tackifying resin sold by Hercules.
[4]A resin derived by copolymerization of pure aromatic monomers, the resin having a melting point of 155° C.
[5]A silane sold by OSI.
[6]Tetrakis [methylene(3,5-di-tert-butyl-4-hydroxyhydrocinnamate)] methane from Ciba Geigy.

The two styrenic block copolymer based hot melt sealants A and B were applied at 250° F. and 350° F., using a wooden board to anchor the metal before applying the sealant. The sealant was applied with a TRIPLEMATIC® hot melt sealant gun in thin strips of sealant of about ¼–⅛ inch thick with slow to medium speed sealant feed. An angled nozzle gun with a ⅜-inch inside diameter nozzle tip flush with the metal surface was used to simulate pressing sealant onto metal as would be done in commercial operation. The sealant was allowed to cool about 10 minutes and was then peeled away with the failure mode noted. The results were as shown hereinbelow in Tables 2 and 3.

TABLE 2

(Sealant Application Temperature, 250° F.)

| Sealant | Temp. | Run 1 Primer 1 | Run 1a Primer 1 | Run 2 Primer 2 | Run 2a Primer 2 | Run 3 No Primer |
|---|---|---|---|---|---|---|
| A | 250° F. | Cohesive failure, excellent bond | Partial cohesive failure, strong bond | Cohesive failure, excellent bond | Partial cohesive failure, strong bond | Fair to poor bond, mostly adhesive failure |

TABLE 2-continued (Sealant Application Temperature, 250° F.)

| Sealant | Temp. | Run 1 Primer 1 | Run 1a Primer 1 | Run 2 Primer 2 | Run 2a Primer 2 | Run 3 No Primer |
|---|---|---|---|---|---|---|
| B | 250° F. | Cohesive failure, excellent bond | Cohesive failure, excellent bond | Cohesive failure, excellent bond | Cohesive failure, excellent bond | Fair bond, mostly adhesive failure |

TABLE 3

(Sealant Application Temperature 350° F.)

| Sealant | Temp. | Run 1 Primer 1 | Run 1a Primer 1 | Run 2 Primer 2 | Run 2a Primer 2 | Run 3 No Primer |
|---|---|---|---|---|---|---|
| A | 350° F. | Cohesive failure, excellent bond | Cohesive failure, excellent bond | Cohesive failure, excellent bond | Cohesive failure, excellent bond | Partial cohesive, good/fair bond |
| B | 350° F. | Partial cohesive failure, excellent bond | Cohesive failure, excellent bond | Cohesive failure, excellent bond | Cohesive failure, excellent bond | No data |

As can be seen there was a significant adhesive advantage when primer was used (Runs 1, 1a, 2, and 2a) as compared with no primer being used (Run 3). At 250° F. and 350° F. application temperatures both primers 1 and 2 were clearly better than no primer.

The endblock resin in the primer gives smoother, harder films which reduces blocking tendencies during storage and minimizes the tendency to transfer to rolls during fabrication processes, such as when making a U-shaped channel from a primer coated flat metal strip.

In a commercial operation of a double paned glass, for example, the metal forming the spacer could be primed on one surface only and passed through a forming machine to give the U-shaped channel depicted in FIG. 2. The sealant could be applied to the cold (room temperature) primed channel, the glass affixed and the unit passed through an infrared oven or other heating means. The infrared rays penetrate the glass to heat the sealant.

While this invention has been described in detail for purposes of illustration, it is not construed as limited thereby but is intended to cover all changes and modifications within the spirit and scope thereof.

What is claimed is:

1. A method of bonding a hot melt adhesive to a metal strip, comprising:
   (a) applying a primer to a metal strip to give a coated surface on a primed metal strip, said primer comprising
      (i) a hydrogenated elastomeric block copolymer having at least two resinous endblocks of polymerized monovinyl aromatic compound and an elastomeric midblock of polymerized conjugated diene, said block copolymer having about 0.02 to about 10 weight percent, based on the weight of said block copolymer, of a grafted component derived from an unsaturated monomer containing a functional group or derivative thereof, and
      (ii) about 10 to about 80 parts by weight per 100 parts by weight of said block copolymer of an endblock compatible aromatic resin;
   (b) drying said primed metal strip;
   (c) bending said primed metal strip to a desired shape; and
   (d) applying said hot melt adhesive to said coated surface of said primed metal strip.

2. The method according to claim 1 wherein said elastoineric block copolymer is a styrene-ethylene/propylene-styrene block copolymer derived from the hydrogenation of a styrene-butadiene-styrene copolymer, said endblocks each having a molecular weight within the range of 5000 to 10,000 and wherein said grafted substance is derived from maleic anhydride and is present in an amount within the range of 0.2 to 2.5 weight percent based on the weight of said copolymer.

3. The method of claim 1 wherein said primer further comprises a solvent.

4. The method of claim 3 wherein said primer is applied to a thickness in the range of about 0.05 mils to about 10 mils.

5. The method of claim 2 wherein said hot melt sealant is an elastomeric block copolymer.

6. The method of claim 5 wherein said hot melt sealant is applied to said primed metal strip at a temperature in the range of about 93° C. to about 204° C.

* * * * *